United States Patent [19]

Curler et al.

[11] E Re. 28,554

[45] Reissued Sept. 16, 1975

[54] FLEXIBLE WRAPPING MATERIAL

[75] Inventors: Howard J. Curler; Glenn E. Lineburg, both of New London, Wis.

[73] Assignee: Curwood, Inc., New London, Wis.

[22] Filed: Aug. 9, 1971

[21] Appl. No.: 164,901

Related U.S. Patent Documents

Reissue of:

[64] Patent No.: 3,445,324
Issued: May 20, 1969
Appl. No.: 599,566
Filed: Dec. 6, 1966

U.S. Applications:

[63] Continuation-in-part of Ser. No. 280,200, May 14, 1963, abandoned.

[52] U.S. Cl. ..... 428/334; 428/510; 428/518; 428/520; 428/532; 428/910

[51] Int. Cl.[2] B32B 23/08; B32B 27/30; B32B 27/32

[58] Field of Search ..... 161/249, 247, 252, 251, 161/165; 117/138.8 E; 99/171 LP, 174

[56] References Cited

UNITED STATES PATENTS

| | | | |
|---|---|---|---|
| 2,504,417 | 4/1950 | Hofrichter, Jr. | 428/509 |
| 2,543,229 | 2/1951 | Chapman | 117/161 UC |
| 2,604,423 | 7/1952 | Slotterbeck et al. | 428/335 |
| 2,627,483 | 2/1953 | Dowd | 117/145 |
| 2,628,172 | 2/1953 | Jenett | 117/145 |
| 2,639,241 | 5/1953 | Cornwall | 117/68 |
| 2,679,969 | 6/1954 | Richter | 161/254 |
| 2,778,760 | 1/1957 | Hurst | 428/337 |
| 2,823,141 | 2/1958 | Hagan et al. | 117/76 |
| 2,919,059 | 12/1959 | Sporka | 229/3.5 |
| 2,932,323 | 4/1960 | Aries | 161/252 |
| 2,956,671 | 10/1960 | Cornwell | 117/68 |
| 2,956,723 | 10/1960 | Tritsch | 161/252 |
| 2,979,774 | 4/1961 | Rusignolo | 264/288 X |
| 2,992,133 | 8/1961 | Zehrung | 117/76 |
| 2,997,170 | 8/1961 | Lowry et al. | 161/402 |
| 3,013,003 | 12/1961 | Maragliano et al. | 260/93.7 |
| 3,033,707 | 5/1962 | Lacy et al. | 156/244 |
| 3,037,868 | 6/1962 | Rosser | 161/45 |
| 3,065,104 | 11/1962 | Kane | 117/76 |
| 3,075,864 | 1/1963 | Anderson | 428/335 |
| 3,082,117 | 3/1963 | Schilly | 117/76 |
| 3,085,901 | 4/1963 | Lindsey et al. | 117/76 |
| 3,108,017 | 10/1963 | Messwark et al. | 117/145 |
| 3,152,694 | 10/1964 | Nashed et al. | 206/63.2 |
| 3,161,532 | 12/1964 | Sill | 117/68 |
| 3,188,265 | 6/1965 | Charbonneau | 161/188 |
| 3,196,040 | 7/1965 | Kane | 117/76 |
| 3,218,224 | 11/1965 | Osborn | 161/247 |
| 3,222,211 | 12/1965 | Updegrove et al. | 117/76 |
| 3,257,489 | 6/1966 | Heffelfinger | 264/289 |
| 3,257,490 | 6/1966 | Hovermale et al. | 264/289 |
| 3,262,808 | 7/1966 | Crooks et al. | 117/93.1 CD |
| 3,297,518 | 1/1967 | Maschner et al. | 161/184 |
| 3,370,972 | 2/1968 | Nagel et al. | 117/7 |
| 3,375,126 | 3/1968 | Nagel | 117/46 |
| 3,502,541 | 3/1970 | Hermitte et al. | 161/186 |
| 3,570,748 | 3/1971 | Coyle | 229/53 |

OTHER PUBLICATIONS

J. Jack, "Biaxial Stretching of Polypropylene, Part 1," British Plastics, Vol. 34, June 1961, pp. 312–318.

J. Jack, "Biaxial Stretching of Polypropylene Film, Part 2," British Plastics, Vol. 34, July 1961, pp. 391–394.

*Primary Examiner*—Alfred L. Leavitt

*Attorney, Agent, or Firm*—Mann, Brown, McWilliams & Bradway

[57] ABSTRACT

A flexible wrapping material resistant to flex cracking and pinhole development and impervious to gas and moisture made by bonding a sheet of biaxially oriented polypropylene to one surface of a sheet of cellophane coated at least on one side with vinylidene chloride copolymer (Saran) and bonding low density polyethylene or other heat-sealable polymeric layer having a melting point substantially below that of the polypropylene to the other surface of the cellophane sheet.

22 Claims, 2 Drawing Figures

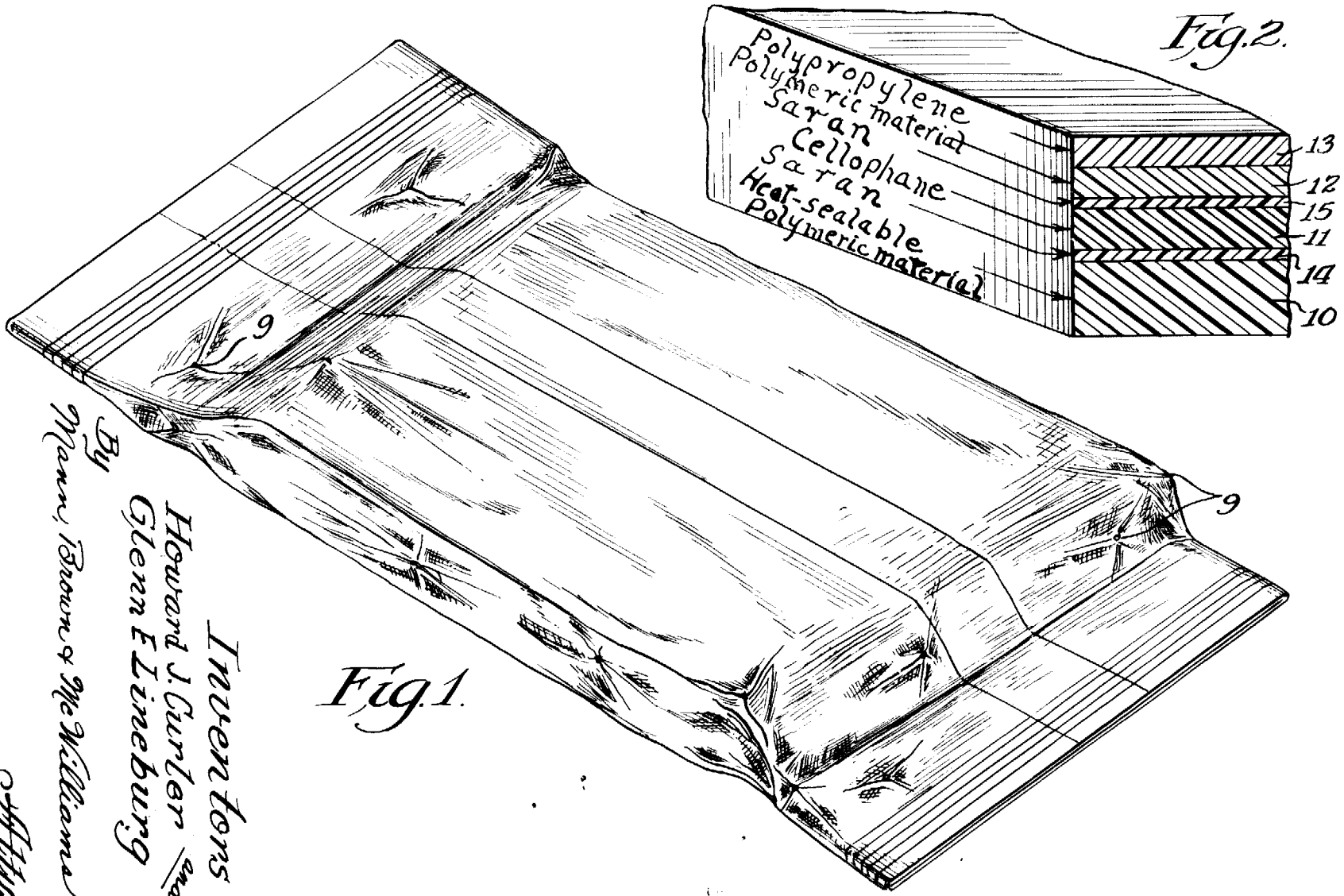
Inventors
Howard J. Curler and
Glenn E Lineburg
By
Mann, Brown & McWilliams
Attys.

FLEXIBLE WRAPPING MATERIAL

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of application Ser. No. 280,200, entitled "Flexible Wrapping Material," filed May 14, 1963, now abandoned, and the disclosure thereof, to the extent that it is not inconsistent herewith, is hereby incorporated by reference.

BRIEF SUMMARY OF THE INVENTION

This invention relates to a flexible wrapping material in laminate form, particularly useful in wrapping food products, and to the method of preparing the same. The wrapping material of this invention is prepared by bonding to one surface of a cellophane sheet, preferably coated on both sides with vinylidene chloride copolymer, a biaxially oriented polypropylene sheet and to the other surface a thin layer of low density polyethylene or other heat-sealable polymeric material having a melting point below that of the polypropylene. Bonding may be accomplished by gluing or by polyethylene lamination.

BRIEF DESCRIPTION OF DRAWINGS

FIG. 1 is a perspective view showing a nonconforming package containing a food product, such as cheese, and showing the areas in which pinhole leaks are inclined to develop with prior art wrapping materials; and FIG. 2 is an enlarged cross-sectional view showing a preferred form of the laminate of this invention.

DETAILED DESCRIPTION

In the packaging of various food products, such as cheese and meat, in a flexible wrapper, difficulty has been experienced with the development of small pinholes in the wrapper at points of stress resulting from flexing of the wrapper during shipment and handling. This results in a loss of the essential barrier characteristics of the wrapper and permits loss or gain of moisture by the package and access of oxygen into the package, with consequent spoilage of the product intended to be protected by the wrapper.

In the so-called nonconforming type of flexible wrapping package, a bulk product, such as cheese or meat, is encompassed by the wrapping material along the side, top and bottom margins of the product, and the wrapping material extends a substantial distance beyond the ends of the product where the package is end-sealed after being gas-flushed with an inert gas such as nitrogen, carbon dioxide, or the like. The resultant package, therefore, has end portions which are subject to deformation, crinkling, wrinkling, and other flexing action caused by pressures of any kind that are applied against unsupported end portions of the package, and particularly end pressures such as occasioned in shipment of the package in a bulk shipping container. The continual flexing of the unsupported ends sooner or later causes pinholes to develop in material, with the result that gas and vapor can pass through the wrapper and accelerate spoilage of the food product.

It should be understood that a "conforming" package, such as results from vacuum packaging, is also subject to pinhole development, although in this type of packaging, the problem is ordinarily not as severe, because the wrapper makes contact with, and is supported by, the product.

Coated and laminated wrapping materials have been used in an effort to provide a proper combination of physical properties in a wrapping material to adequately protect the food product contained within the package, but none of the materials used for this purpose have satisfactorily solved the pinhole problem of nonconforming packages.

For example, a coated sheet has been used comprising a base material consisting of polyethylene terephthalate (commonly known as "Mylar" sold by E. I. duPont de Nemours & Co., Inc.) with the base material being exteriorly coated with a vinylidene chloride copolymer (commonly known as "Saran" and sold by Dow Chemical Company of Midland, Michigan), and with the inside of the wrapping material having a polyethylene film used for its heat-sealing properties. Such a wrapping material of this general type is sold, for example, under the trade designation "MKP-5200" and is made by Curwood, Inc., of New London, Wisconsin. Experience has taught, however, that this type of material, which is the best available for nonconforming food packaging, is still subject to pinhole cracking.

We have discovered a new and unique combination of sheet materials which, in a laminated construction provides the required functional properties, and, in addition, gives the necessary resistance to flex cracking and pinholing to give a successful wrapper.

The present invention has, for its primary object, the solving of the pinhole problem, and the accomplishment of this result while still preserving in the food wrapper the desirable and necessary physical properties of a satisfactory wrapping material.

A further object of the invention is to provide a wrapping material of this general classification which uses relatively inexpensive laminate materials; which is completely adaptable to present heat-sealing machines and equpment; which has appropriate barrier properties with respect to gases and vapors, and which, in addition to being substantially pinhole-proof, is also abrasion-resistant.

Further and other objects of the invention will become apparent as the disclosure proceeds and the description is read in conjunction with the accompanying drawings.

The novel wrapper of this invention comprises a cellophane substrate sandwiched between layers or films of low temperature, heat-sealable plastic material and a layer or film of polypropylene on one outer surface of the laminate. Preferably, the cellophane substrate is coated on both sides with vinylidene chloride copolymer such as that marketed under the name "Saran" in order to improve impermeability to gas. "Saran" is a well known product as disclosed on pages 444 through 448 of Golding on "Polymers and Resins," published by D. Van Nostrand Company, Inc., 1959 edition. On page 444 it is stated: "The name 'saran' represents a series of vinylidene chloride copolymers with vinyl chloride or acrylonitrile. (Saran F)".

Referring to the drawing, the numeral 10 indicates a layer or film of low temperature, heat-sealable plastic material, i.e., a material which is heat-sealable at temperatures below 300° Fahrenheit and preferably below 250° Fahrenheit, and which has good heat-seal strength. While we prefer polyethylene for this purpose, other low temperature, heat-sealable materials such as ethylene-vinyl acetate copolymer or ethylene-vinyl acetate copolymer blended with microcrystalline wax and paraffin wax in suitable proportions may be used. The base or substrate 11 of the laminate is cellophane preferably coated on both sides with a thin layer of Saran 14 and 15. Although we prefer to include a layer or film 12 corresponding to 10, layer 12 may be a suitable bonding material such as a curing type or rubber type polymer. The outer layer 13 is a plastic film or layer having high temperature resistance as compared to layers 10 and 12. Because of its superior properties and relative low cost, we prefer to use an oriented polypropylene for layer 13 and preferably balanced, heat-set, biaxially oriented polypropylene film. Heat-set film is dimensionally stable when exposed to sealing temperatures whereas nonheat-set film shrinks to its original shape when exposed to sealing temperatures. The degree of balance, i.e., whether the film is equally oriented in both machine and cross-machine directions is not critical. Films of different degrees of balance function satisfactorily in the finished laminate. The most economical, thinnest gauge polypropylene film of good quality available is preferably used but the thickness is not critical so long as the film has the requisite flexibility. Although 50-gauge polypropylene film is generally used, we have used 60-gauge with entirely satisfactory results. Film thickness may vary from 25 to 150-gauge (0.25 to 1.5 mils). The Moplefane OTT polypropylene specified in the examples hereinafter given is treated on both sides to facilitate bonding, as indicated by the designation "OTT" meaning "stabilized against shrinkage, and treated on both sides."

When polyethylene is used for layers 10 and/or 12, it should have a density of from about 0.910 to about 0.930 and a melt index from about 2 to about 22, although we prefer a density of about 0.916 and a melt index about about 4. Melt index is the amount of flow in decigrams through a fixed orifice at a fixed temperature. At the two extremes of melt index range it is difficult to control the flow of the hot polyethylene. The thickness of the polyethylene lamination between the polypropylene and cellophane layers is important in that tests indicate that thicker film is more resistant to flex cracking than the thinner film. From an economic viewpoint it is not practicable to use a coating exceeding 2 to 3 mils in thickness. Thicknesses between 0.3 and 2 mils produce a satisfactory coating.

Some variation in the thickness of the polyethylene coating which forms the heat-sealing layer 10 is permissible and will be dictated by manufacturing practice and economics as well as performance of the finished product. Generally, a thickness of about 2 mils is preferred but the thickness may range from 0.5 to 4 mils.

When polyethylene film is applied as the heat-sealing layer to the substrate, the minimum thickness of the film is dictated to some extent by the film making process. It is difficult to produce polyethylene film by the blown method of thickness less than 1 mil, which is sufficiently uniform for laminating. Hence, we prefer to use film having a thickness of from 1 to 4 mils with 2 mils being preferred. Since film resins generally are lower in melt index due to the lower processing temperatures, the melt index range of the preferred films is 0.5 to 12 and the preferred density is about 0.916.

As previously pointed out, instead of using polyethylene for heat-sealing layer 10, other polymeric materials that seal at relatively low temperatures and have good seal strength may be used. The same materials may be used for the adhesive layer 12. As examples of such materials may be mentioned ethylene-vinyl acetate copolymer, with or without admixture with paraffin and microcrystalline wax. Ethylene-vinyl acetate copolymers containing from about 0.5 to 26% by weight are satisfactory. When using ethylene-vinyl acetate copolymer mixed with wax as the sealing or adhesive layer it is applied by roll coating instead of by extrusion. Ethylene-vinyl acetate copolymer may be applied as a coating or as a preformed film, glue-laminated to the cellophane substrate.

Vinyl film such as polyvinyl chloride (PVS) and polyvinyl chloride-polyvinyl acetate copolymers (PVCAC) may also be used in place of the polyethylene. The vinyl films have even lower melting points than low density polyethylene and in addition have good tear strength, low water absorption and moderately good chemical resistance, but are much more costly.

The wrapper of this invention may be used for the hand wrapping of a product, but ordinarily the wrapper is used on an automatic machine which forms and closes the package by means of heat sealing. Use of a thermoplastic material for the inner surface of the wrapper, and forming the package with a face-to-face relationship of this material, permits the formation of a heat-sealed closure which is gas-tight. With some products, such as cheese and meat, it is found advantageous to displace the air from the void space inside the package by flushing with an inert gas, or by evacuation, before sealing the package. The retention of this gas, or vacuum, and the substantial exclusion of the atmospheric oxygen, is important to the proper preservation of the product.

With many products, the dimensions of the package are such that it is necessary to provide an excess of wrapping material in order to bring the end portions of the wrapper together in a flat, face-to-face relationship, which is free of wrinkles that would give channels through the heat-sealed seam. Forcing the flat wrapper to enclose a rectangular product in this way gives rise to three-way creases which meet in a sharp point in the end portions of the package. As this excess portion of the wrapper is flexed during handling and shipment, there is an accumulation of stresses at these points, or at any other point where flexing has produced intersecting creases. The strength and flexibility of previously known and used wrappers has not been adequate to withstand these repeated concentrated stresses. This has resulted in the development of the flex cracks and pinholes in the end portions of the wrapper, as shown at 9 in FIG. 1, with consequent loss of the barrier properties of the wrapper, and failure of the package.

We prefer to extrusion laminate the composite sheet, although glue lamination may be employed if desired. Where the layers are glue-laminated, polyurethanes, polyesters and other curing-type polymers which cross-link or permanently tacky glues, such as rubber or synthetic rubber based compositions may be used as the gluing material. The amount of glue used will generally range from 1 to 1.5 pounds per 3,000 square feet of sheet. The reasons for the unexpected and exceptional performance of the preferred combination of materials, and the preferred extrusion lamination and coating process, with respect to resistance to flex cracking and pinhole development, is not fully understood. It is believed to be due in some way to the distribution of stresses and the interaction of the essential component layers of the lamination so as to deliver maximum performance of the wrapper.

As before stated, the most satisfactory wrapping material for nonconforming packages has been Mylar used as the base sheet with an inner polyethylene coating for sealing, but tests have shown it to be subject to objection because of flex cracking and pinhole development.

In our laminate, which uses relatively inexpensive materials, the cellophane provides a nonthermoplastic base layer which gives good performance over a broad range of sealing temperatures without "burn-through," and has good strength and stretch resistance which is desirable; the Saran, if used, supplies a good barrier against the passage of gases and vapors; the inside polyethylene coating 10 also adds to the moisture barrier and, in addition, serves as a heat-sealing medium for package closure; the outer polyethylene coating or layer 12 again adds to the moisture barrier, but, more importantly, serves, with the inside polyethylene layer 10, to confine the cellophane layer 11 in sandwich fashion, and, thereby, through the flexible properties of the polyethylene, give physical interface support to the more brittle cellophane layer contained therebetween; and the exterior layer 13 serves the purpose of allowing the polyethylene-encased cellophane to be satisfactorily used in conventional heat-sealing machines, since it has a melting point above that of the adjacent polyethylene.

The oriented polypropylene film used for the outside layer 13, which polypropylene is preferably biaxially oriented, has the advantage of being tough, flexible, stretch-resistant, and resistant to surface abrasion, while also preventing sticking of the wrapper to the heat-sealing bars on the packaging machine.

Although the wrapping material of this invention is particularly useful in conjuction with nonconforming packaging procedures, it should be understood that the material is also applicable to and useful in conjunction with vacuum packing and conforming wrappers.

The relative thickness of the composite layers of the laminate of this invention may, of course, vary within the limits which will be recognized by those skilled in the art. In a typical sheet, the composite thickness of the cellophane layer 11 with the flanking Saran layers, when used, may be on the order of 0.8 mil, the inside polyethylene coating 10 may be on the order of 1½ mils, the outside polyethylene coating 12 may be on the order of 0.5 mil, and the polypropylene coating 13 may be on the order of 0.5 mil.

Before laminating the polyethylene or other heat-sealable film to the cellophane, the cellophane is prime coated with polyethylene imine or organic titanate such as tetra-isopropyl titanate in order to afford better adhesion between the two layers.

Certain preferred embodiments of this invention and methods of making the laminate are illustrated in the following specific examples:

No. 1. A film of 50-gauge, heat-set, biaxially oriented polypropylene, Moplefane OTT from Montecatini of Italy, was extrusion laminated to 250 RS 1-E cellophane (Saran-coated) from American Viscose Corp., with five pounds, per 3,000 square feet, of polyethylene, U.S.I. grade 203-2, having a nominal density of 0.916 and a melt index of 8.0. This lamination was then extrusion coated on the cellophane side with 26 pounds, per 3,000 square feet, of polyethylene, U.S.I. grade 203-2. The cellophane was prime-coated on both sides with a dilute solution of polyethylene imine before combining with the polyethylene.

No. 2. A film of 50-gauge, heat-set, biaxially oriented polypropylene, Moplefane OTT from Montecatini of Italy, was extrustion laminated to 250 RS 1-E cellophane (Saran-coated) from American Viscose Corp., with seven pounds per 3,000 square feet, of polyethylene, Monsanto grade MPE-70, having a nominal density of 0.919 and a melt index of 5.0, This lamination was then extrusion coated on the cellophane side with 24 pounds, per 3000 square feet, of polyethylene, Monsanto grade MPE-70. The cellophane was prime-coated on both sides with a dilute solution of polyethylene imine in the amount of 0.1 pound per 3000 square feet of cellophane before combining with the polyethylene in order to promote adhesion of the polyethylene to the cellophane.

No. 3. A film of 50-gauge, heat-set, biaxially oriented polypropylene, Moplefane OTT from Montecatini of Italy, was extrusion laminated to 250 XCP 6-05cellophane (Saran-coated) from duPont, with five pounds, per 3000 square feet, of polyethylene, U.S.I. grade 203-2, having a nominal density of 0.916 and a melt index of 8.0. This lamination was then extrusion coated on the cellophane side with 26 pounds, per 3,000 square feet, of polyethylene, U.S.I. grade 203-2. The cellophane was prime-coated on both sides with a dilute solution of polyethylene imine before combining with the polyethylene.

In the foregoing examples the numeral 250 means that the cellophane yields 25,000 square inches of film per pound. The other designation letters and numbers preceding "cellophane" are the manufacturer's identification of the product.

The laminated wrappers from Examples 1 and 2 above were used for the packaging of blocks of natural cheese, using Hayssen Model RT wrapping machine. Air was flushed from the packages with carbon dioxide, using the gas flushing technique. A number of sealed packages with each type of wrapper were assembled in a corrugated shipping container.

For purposes of comparison, similar packages were prepared at the same time on the same machine, using the best available commercial wrapper consisting of 50 Saran-coated Mylar, coated on one side with 2 mils of polyethylene.

Packages of each of the wrappers from the examples, and the above control wrappers, assembled in the shipping container, were subjected to flexing stresses, intended to simulate actual handling and shipping stresses, by shaking the shipping container full of packages on a circular, synchronous shaking table, having an amplitude of one inch, and a frequency of 210 cycles per minute. The presence of pinholes in each package wrapper was determined by applying slight air pressure to the package through a hypodermic needle, and inspecting the package for the origin of gas bubbles when held under water.

The shaking period used, and the resulting pinhole development from flex cracking observed in the above tests are shown in the following table:

TABLE I.

FLEX CRACK FAILURE OF WRAPPERS ON SHAKEN PACKAGES

| Wrapper | Number Packages | Hours Shaking | Flex Crack Failures On Submersion Test Number | Flex Crack Failures On Submersion Test % Failures |
|---|---|---|---|---|
| Example No. 1 | 36 | 2.5 | 2 | 6 |
| Example No. 1 | 16 | 2.5 | 1 | 6 |
| Example No. 2 | 13 | 4 | 0 | 0 |
| Mylar-Polyethylene | 13 | 2.5 | 9 | 70 |
| Mylar-Polyethylene | 8 | 2.5 | 8 | 100 |
| Mylar-Polyethylene | 8 | 2.5 | 8 | 100 |
| Mylar-Polyethylene | 10 | 4 | 10 | 100 |

Another test which has been used to determine the relative effectiveness of different wrapping materials is to subject the packages to the same general shaking procedures as outlined in the above test and then store the packages under refrigerated conditions to determine the condition of the cheese at the end of a given period of time, say 4 weeks. This test was run with the wrapper of Example No. 2, comparing the results with the Mylar wrapper, and it was found that the wrapper of this invention when used in 23 packages which were shaken for a 4-hour period had only one package develop mold, representing 4% failure; whereas, with the Mylar-polyethylene wrapper, 26 packages shaken for a like period of 4 hours and then stored under identical refrigeration condition for the same period of time showed mold development in 20 of the 26 packages, or a failure of 77%.

The surprising superiority of our new wrapping material has also been confirmed by an independent laboratory using other testing techniques in which it was established that the Mylar material failed after 15,000 cycles of flexing, whereas the wrapping material of this invention showed no signs of failure after 150,000 cycles of flexing.

Considering the fact that the laminate of this invention uses as base material the relatively fractile material cellophane, it is astounding that by this unique coacting combination of cellophane with other materials it is possible to obtain a wrapping material which shows a ten-to-one, or even greater, superiority over the strong and tough material Mylar with respect to flex cracking and pinhole development.

The following Table II indicates these variations in the preparation of the finished laminated sheet which may be made while retaining the important characteristics and properties previously pointed out. It will be apparent from the table that the essential layers are the cellophane substrate, preferably Saran-coated, oriented polypropylene as the outer layer bonded to the cellophane with polyethylene or gluing material, and polyethylene or equivalent heat-sealable material as the inside layer bonded to the opposite surface of the cellophane by means of extrusion coating or by means of suitable glue.

We claim:

1. A flexible, laminated, heat-sealable wrapping material particularly suitable for use in the packaging of food products and other products which are to be maintained in hermetically sealed relationship to the atmosphere, and in which the package is of the nonconforming type whereby the wrapping material may be subjected to considerable flexing and bending which is conducive to flex cracking of the material and the development of pinholes therein, said material being characterized by its resistance to flex cracking and pinhole development, and by its imperviousness to gas and moisture, comprising a cellophane sheet, coated with a layer of a vinylidene chloride copolymer, and sandwiched between and bonded on one side to a polymeric layer having good heat-seal strength, and bonded on the other side, by a layer of bonding material, to a biaxially oriented polypropylene sheet treated on its inner face to facilitate bonding so that said polypropylene sheet forms one surface of said laminated material, and said polymeric layer forms the opposite surface of said material, said polymeric layer being heat-sealable at a temperature substantially below the melting point of said polypropylene sheet, and said polymeric layer being selected from a group consisting of polyethylene and ethylene-vinyl acetate copolymers.

2. A wrapping material in accordance with claim 1 in which the polymeric layer forming one surface of the sheet is low density polyethylene.

3. A wrapping material in accordance with claim 1 in which the polypropylene and cellophane sheets are bonded together by means of polyethylene.

4. A wrapping material in accordance with claim 3 in which the polyethylene bonding material is an extrusion-laminated layer between the polypropylene sheet and the cellophane sheet and the polymeric layer is a polyethylene extrustion-coated layer on the cellophane sheet.

5. A wrapping material in accordance with claim 1 in which the cellophane sheet has a thickness of the order of about 0.8 mil, the polymeric layer has a thickness of the order of about 1.5 mils, and the polypropylene has a thickness of the order of about 0.5 mil.

6. A wrapping material in accordance with claim 4 in which the polyethylene has a density of about 0.910 to about 0.930 and a melt index above 4.

7. A wrapping material in accordance with claim 1 in which the polymeric layer is an ethylene-vinyl acetate copolymer bonded to the cellophane sheet by extrusion coating said polymeric layer containing vinyl acetate within the range of 0.5% to 26% by weight.

TABLE II

| Outside Layer (13) | Bond (12) | Substrate (11) | Bond (Between 10 & 11) | Heat-seal Layer (10) |
|---|---|---|---|---|
| OPP[1] | PE[2] | Cellophane | — | PE coating[3] |
| OPP | Glue | " | — | PE coating |
| OPP | Glue | " | Glue | PE film |
| OPP | PE | " | Glue | PE film |

[1]oriented polypropylene
[2]polyethylene
[3]polyethylene or equivalent low temperature heat-sealable polymer

8. A wrapping material in accordance with claim 1 in which the polymeric layer is a preformed film, glue-laminated to the cellophane sheet.

9. A wrapping material in accordance with claim 4 in which the polypropylene sheet has a thickness of about 0.25 to 1.5 mils, the thickness of the cellophane sheet is such as to weigh about one pound per 25,000 square inches, the thickness of the polyethylene lamination between the polypropylene and cellophane is 0.3 to 2 mils and the thickness of the extrusion-coated polyethylene layer is 0.5 to 4 mils.

10. A flexible, laminated, heat-sealable wrapping material particularly suitable for use in the packaging of food products and other products which are to be maintained in hermetically sealed relationship to the atmosphere, and in which the package is of the nonconforming type whereby the wrapping material may be subjected to considerable flexing and bending which is conducive to flex cracking of the material and the development of pinholes therein, said material being characterized by its resistance to flex cracking and pinhole development, and by its imperviousness to gas and moisture, consisting essentially of, and bonded together and in the order specified (1) a biaxially oriented polypropylene sheet having its inner face treated for receptivity to a polymeric bonding material, (2) a polymeric bonding material, (3) cellophane coated on at least one side with a vinylidene chloride copolymer, and (4) a heat-sealable polymeric material bonded to the coated cellophane and having a melting point substantially below the melting point of said polypropylene sheet, said heat-sealable, polymeric material being selected from a group consisting of polyethylene and ethylene-vinyl acetate copolymers.

11. A wrapping material as set forth in claim 10, in which the polymeric bonding material between the polypropylene and the cellophane is polyethylene.

12. A wrapping material as set forth in claim 10, in which the heat-sealable polymeric material is a polyethylene having a density of about 0.914 to about 0.925.

13. A wrapping material as set forth in claim 10, in which the polypropylene sheet has a film thickness between 0.25 and 1.5 mils, the polymeric bonding material has a thickness between 0.3 and 2 mils, the cellophane layer has a thickness on the order of about 0.8 mil, and the heat-sealable polymeric material has a thickness of from 0.5 to 4 mils.

*14. A flexible, laminated, heat-sealable wrapping material particularly suitable for use in the packaging of food products and other products which are to be maintained in hermetically sealed relationship to the atmosphere, and in which the package is of the nonconforming type whereby the wrapping material may be subjected to considerable flexing and bending which is conducive to flex cracking of the material and the development of pinholes therein, said material being characterized by its resistance to flex-cracking and pinhole development, and by its imperviousness to gas and moisture, comprising a cellophane sheet, coated with a layer of vinylidene chloride copolymer, and sandwiched between and bonded on one side to a polymeric layer having good heat-seal strength, and bonded on the other side, by a layer of bonding material, to a heat-set biaxially oriented polypropylene sheet treated on its inner face to facilitate bonding so that said polypropylene sheet forms one surface of said laminated material, and said polymeric layer forms the opposite surface of said material, said polymeric layer being heat-sealable at a temperature substantially below the melting point of said polypropylene sheet, and said polymeric layer being selected from a group consisting of polyethylene and ethylene-vinyl acetate copolymers.*

*15. A wrapping material in accordance with claim 14, in which a polymeric layer forming one surface of the sheet is low density polyethylene.*

*16. A wrapping material in accordance with claim 14, in which the polypropylene and cellophane sheets are bonded together by means of polyethylene.*

*17. A wrapping material in accordance with claim 16, in which the polyethylene bonding material is an extrusion-laminated layer between the polypropylene sheet and the cellophane sheet and the polymeric layer is a polyethylene extrusion-coated layer on the cellophane sheet.*

*18. A wrapping material in accordance with claim 14, in which the cellophane sheet has a thickness of the order of about 0.8 mil, the polymeric layer has a thickness of the order of about 1.5 mils, and the polypropylene has a thickness of the order of about 0.5 mil.*

*19. A wrapping material in accordance with claim 17, in which the polyethylene has a density of about 0.910 to about 0.930 and a melt index above four.*

*20. A wrapping material in accordance with claim 14, in which the polymeric layer is an ethylene-vinyl acetate copolymer bonded to the cellophane sheet by extrusion coating said polymeric layer containing vinyl acetate within the range of 0.5 to 26% by weight.*

*21. A wrapping material in accordance with claim 14, in which the polymeric layer is a preformed film, glue-laminated to the cellophane sheet.*

*22. A wrapping material in accordance with claim 17, in which the polypropylene sheet has a thickness of about 0.25 to 1.5 mils, the thickness of the cellophane sheet is such as to weigh about one pound per 25,000 square inches, the thickness of the polyethylene lamination between the polypropylene and cellophane is 0.3 to 2 mils and the thickness of the extrusion-coated polyethylene layer is 0.5 to 4 mils.*

* * * * *

UNITED STATES PATENT OFFICE

CERTIFICATE OF CORRECTION

Patent No. Re. 28,554 Dated 9/16/75

Inventor(s) Howard J. Curler and Glenn E. Lineburg

It is certified that error appears in the above-identified patent and that said Letters Patent are hereby corrected as shown below:

Column 3, line 42, "about", first appearance should be --above--; Column 6, line 50, add the word --gauge-- after the numeral "50".

Signed and Sealed this

*seventeenth* Day of *February 1976*

[SEAL]

*Attest:*

RUTH C. MASON
*Attesting Officer*

C. MARSHALL DANN
*Commissioner of Patents and Trademarks*